United States Patent
Thomas (10) Patent No.: US 9,982,794 B2
(45) Date of Patent: May 29, 2018

(54) PASSIVE EXHAUST VALVE WITH EXTERNAL TORSION SPRING

(71) Applicant: Tenneco Automotive Operating Company Inc., Lake Forest, IL (US)

(72) Inventor: Stephen M. Thomas, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 1 day.

(21) Appl. No.: 15/229,189

(22) Filed: Aug. 5, 2016

(65) Prior Publication Data

US 2018/0038495 A1   Feb. 8, 2018

(51) Int. Cl.
*F16K 15/03* (2006.01)
*F01N 13/08* (2010.01)
*B23P 15/00* (2006.01)

(52) U.S. Cl.
CPC .......... *F16K 15/033* (2013.01); *B23P 15/002* (2013.01); *F01N 13/08* (2013.01); *F01N 2390/08* (2013.01); *Y10T 137/7898* (2015.04); *Y10T 137/7901* (2015.04)

(58) Field of Classification Search
CPC ...... F16K 15/033; B23P 15/002; F01N 13/08; F01N 2390/08; Y10T 137/7898; Y10T 137/901
USPC ........................................ 251/299, 300, 303
See application file for complete search history.

(56) References Cited

U.S. PATENT DOCUMENTS

| | | | |
|---|---|---|---|
| 3,234,924 A * | 2/1966 | May | F02D 9/04 123/323 |
| 3,395,727 A | 8/1968 | Weise | |
| 3,926,216 A | 12/1975 | Rulcker | |
| 4,617,959 A | 10/1986 | Yamada | |
| 4,699,244 A * | 10/1987 | Bergquist | F01N 1/165 181/226 |
| 4,860,790 A | 8/1989 | Scaramucci | |
| 5,305,787 A | 4/1994 | Thygesen | |
| 5,355,673 A * | 10/1994 | Sterling | F01N 13/082 137/527 |
| 5,584,315 A | 12/1996 | Powell | |
| 5,709,241 A | 1/1998 | Iwata | |
| 6,328,062 B1 | 12/2001 | Williams et al. | |
| 6,581,721 B2 | 6/2003 | Nagai et al. | |
| 6,648,013 B1 | 11/2003 | Ray | |

(Continued)

FOREIGN PATENT DOCUMENTS

JP           2011208565 A    10/2011

*Primary Examiner* — Marina Tietjen
*Assistant Examiner* — Frederick D Soski
(74) *Attorney, Agent, or Firm* — Harness, Dickey & Pierce, P.L.C.

(57) ABSTRACT

A snap-action valve assembly for an exhaust system includes a valve flap positioned within a conduit. A shaft supports the valve flap in the conduit for rotation about a pivot axis between a closed position and an open position. A roller is supported for rotation on a post. The post is fixed to the shaft by a lever arm. A torsion spring includes a first end coupled to the conduit and a second end coupled to the roller. The torsion spring is preloaded to urge the valve flap into contact with an inner surface of the conduit when the valve flap is in the closed position. A method of assembling the snap-action valve assembly with a predetermined spring preload torque is also discussed.

11 Claims, 4 Drawing Sheets

(56) References Cited

U.S. PATENT DOCUMENTS

| | | |
|---|---|---|
| 6,679,289 B2 | 1/2004 | Sisk |
| 6,679,290 B2 | 1/2004 | Matthews et al. |
| 6,736,160 B2 | 5/2004 | Nagai et al. |
| 7,434,570 B2 | 10/2008 | Hill |
| 7,451,854 B2 * | 11/2008 | Suzuki .................... F01N 1/165 |
| | | 181/237 |
| 7,798,235 B2 | 9/2010 | Mondelli et al. |
| 7,805,933 B2 | 10/2010 | Hanitzsch et al. |
| 7,896,130 B2 | 3/2011 | Hill et al. |
| 8,191,572 B2 | 6/2012 | Lefler et al. |
| 8,201,401 B2 * | 6/2012 | Abram .................... F01N 1/166 |
| | | 137/115.16 |
| 8,657,065 B1 | 2/2014 | Hill |
| 9,605,581 B1 * | 3/2017 | Middleton, Jr. ........ F01N 13/08 |
| 9,624,837 B2 * | 4/2017 | Abram .................... F01N 13/08 |
| 9,651,160 B2 | 5/2017 | Barone |
| 2008/0236680 A1 * | 10/2008 | Abram ...................... F01N 1/08 |
| | | 137/527 |
| 2008/0237521 A1 * | 10/2008 | Abram ...................... F02D 9/04 |
| | | 251/213 |
| 2009/0126356 A1 * | 5/2009 | Abram .................... F01N 13/08 |
| | | 60/324 |
| 2010/0308517 A1 | 12/2010 | Goodson et al. |
| 2012/0175002 A1 * | 7/2012 | Trentadue ............. F16K 15/033 |
| | | 138/37 |
| 2013/0056083 A1 * | 3/2013 | Abram ...................... F01N 1/08 |
| | | 137/2 |
| 2013/0232961 A1 * | 9/2013 | Abram ................. F16K 15/033 |
| | | 60/324 |
| 2013/0233269 A1 | 9/2013 | Houtschilt et al. |
| 2015/0027566 A1 | 1/2015 | Kobori |
| 2015/0052760 A1 | 2/2015 | Keschner |
| 2015/0152760 A1 | 6/2015 | Kainuma et al. |
| 2016/0222863 A1 * | 8/2016 | Middleton, Jr. ........ F01N 13/08 |

\* cited by examiner

PASSIVE EXHAUST VALVE WITH EXTERNAL TORSION SPRING

FIELD

The present disclosure relates to valve assemblies used in an exhaust system of a vehicle and to methods of manufacturing such valve assemblies.

BACKGROUND

This section provides background information related to the present disclosure which is not necessarily prior art.

Over the course of time, several vehicle exhaust systems have incorporated active and/or passive valve assemblies to alter the characteristics of the exhaust flow through a conduit as an exhaust pressure increases due to an increasing engine speed. Active valves typically carry an increased expense associated with an actuator, such as an electric solenoid. Passive valves utilize the pressure of the exhaust flow in the conduit to actuate the valve. Even though the passive valves are typically less expensive, traditional passive valves may create an undesirable increase in backpressure as the valve opens.

Both active and passive valves may be subject to difficulties in manufacturability that may be susceptible to vibration related noise and valve flutter caused by fluctuations in the exhaust flow rate exiting the engine. Additional complexities have arisen in the prior art in that several different variations of a certain passive valve are manufactured to account for different engine/vehicle specifications. Undesirable product proliferation may exist in order to account for the wide range of internal combustion engine displacements and exhaust conduit diameters used by vehicle manufacturers. Accordingly, a need in the art exists for a relatively inexpensive valve that may be easily manufactured from a small number of common subcomponents that meets the broad range of requirements from original equipment vehicle manufacturers.

SUMMARY

This section provides a general summary of the disclosure, and is not a comprehensive disclosure of its full scope or all of its features.

A snap-action valve assembly for an exhaust system includes a valve flap positioned within a conduit. A shaft supports the valve flap in the conduit for rotation about a pivot axis between a closed position and an open position. A roller is supported for rotation on a post. The post is fixed to the shaft by a lever arm. A torsion spring includes a first end coupled to the conduit and a second end coupled to the roller. The torsion spring is preloaded to urge the valve flap into contact with an inner surface of the conduit when the valve flap is in the closed position. A method of assembling the snap-action valve assembly with a predetermined spring preload torque is also discussed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring to the Figures, wherein like numerals indicate corresponding parts throughout the several views, a snap-action valve assembly 20 for an exhaust system of a vehicle is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, snap-action valve assembly 20 includes a conduit 22 in the form of a tube having a circular cross-sectional shape. The conduit depicted in the Figures is merely exemplary and other conduits within the scope of the present disclosure may have a variety of different shapes and sizes and may be alternatively described as tubes or pipes. Conduit 22 includes a wall 24 having an inner surface 26 and an outer surface 28. Conduit 22 may be constructed from a variety of different materials. By way of non-limiting example, the conduit wall 24 may be made from SS409 or SS439 stainless steel. The wall may be first formed from a flat blank and subsequently rolled and welded along a longitudinal seam.

Figure 1:
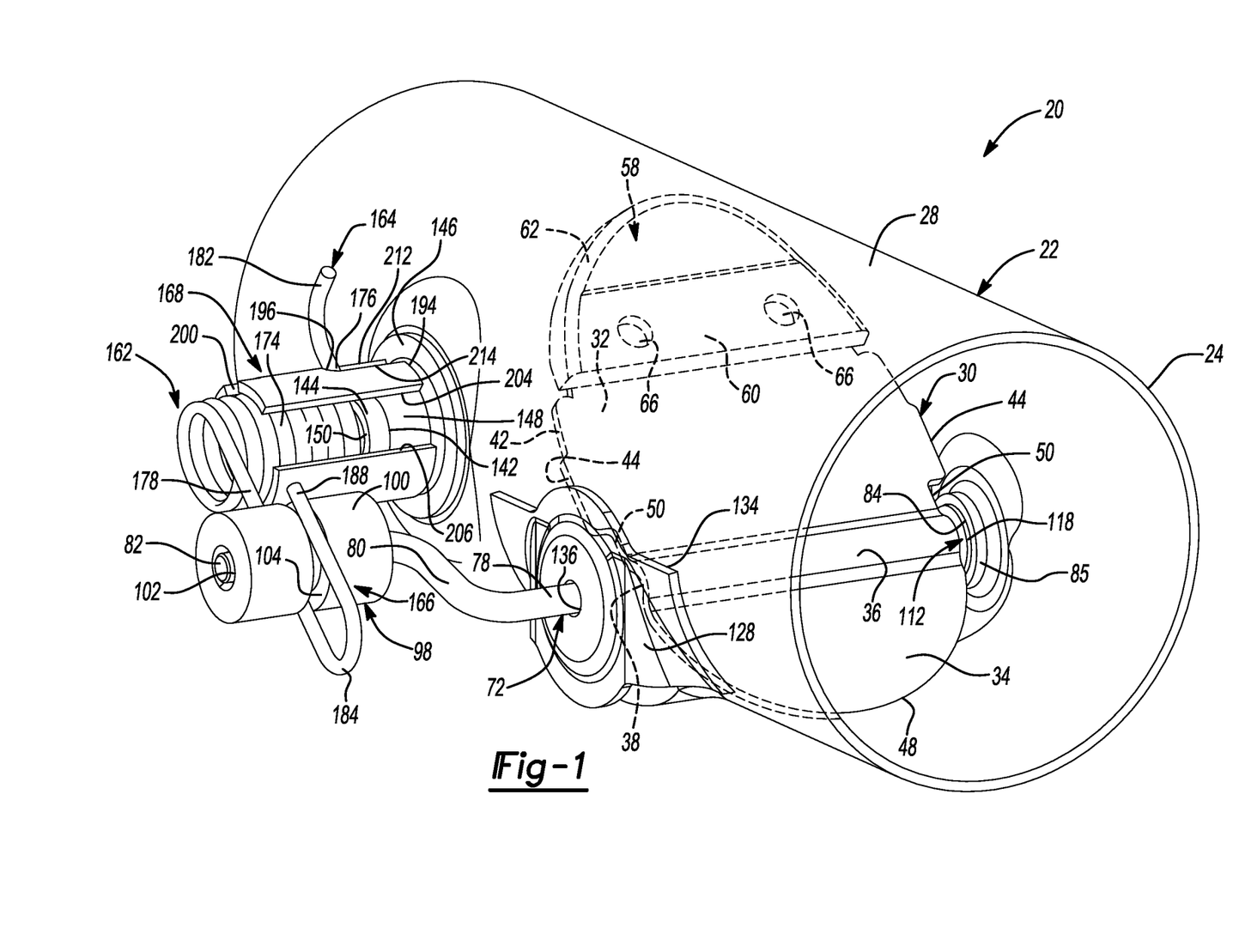
FIG. 1 is a perspective view of a snap-action valve assembly constructed in accordance with the teachings of the present disclosure.
Figure 2:
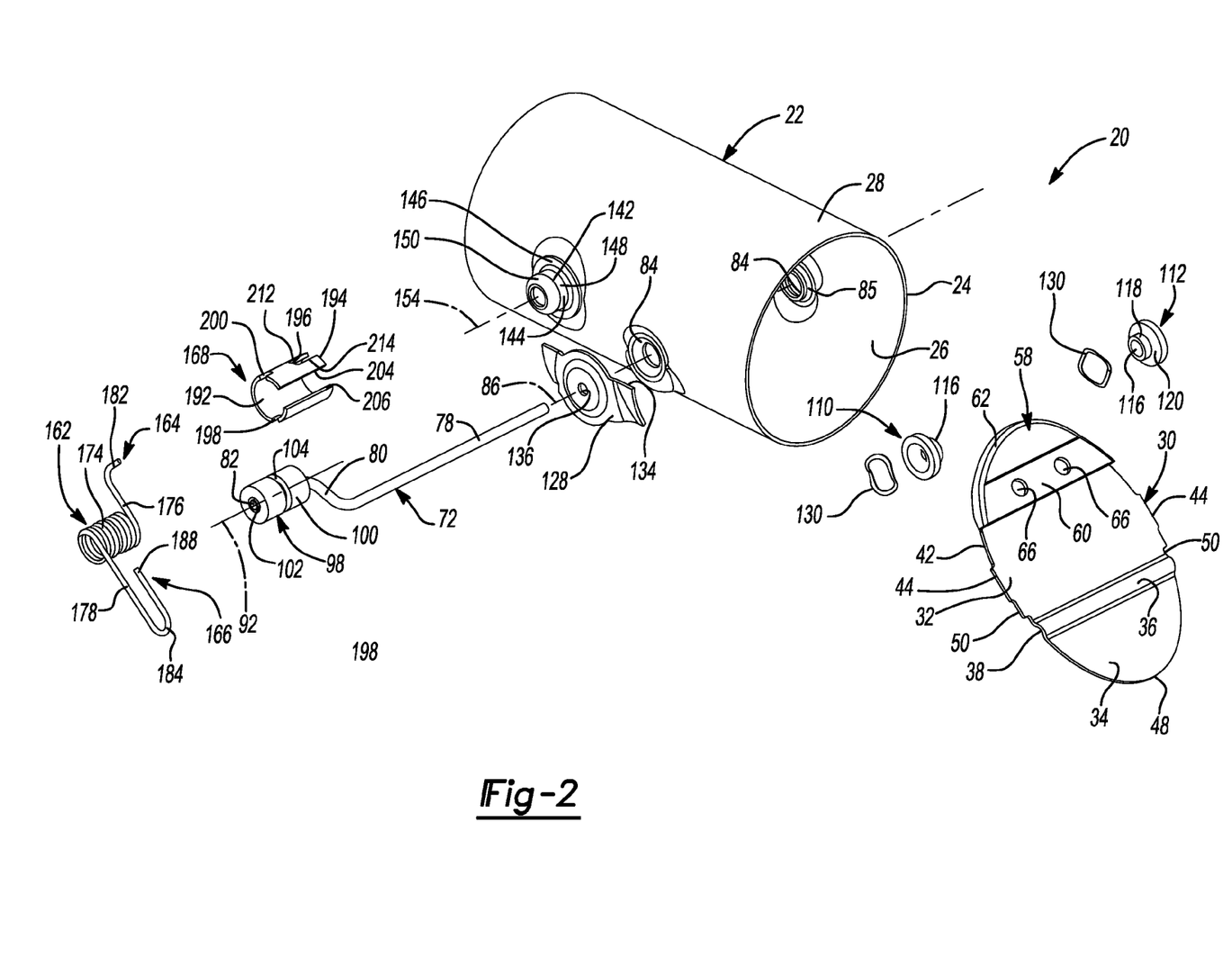
FIG. 2 is an exploded perspective view of the snap-action valve assembly.

Snap-action valve assembly 20 includes a valve flap 30 positioned within conduit 22. Valve flap 30 is a substantially planar component including a first planar portion 32, a second planar portion 34, and a curved portion 36 interconnecting first portion 32 and second portion 34. The curved portion 36 defines a channel 38 that extends transversely across the valve flap 30 at a position that causes first planar portion 32 to be larger than second planar portion 34. First planar portion 32 includes a first arcuate edge 42 and a pair of linear side edges 44. Second planar portion 34 includes a second arcuate edge 48. Valve flap 30 also includes a pair of bushing cutouts 50 positioned near curved portion 36. It should be appreciated that curved portion 36 of valve flap 30 is offset from a line of symmetry of valve flap 30 such that first planar portion 32 has a greater surface area than second planar portion 34. Valve flap 30 may be made from a variety of different materials. By way of non-limiting example, valve flap 30 may be made from SS409 or SS439 stainless steel.

Snap-action valve assembly 20 includes a pad 58 that is fixed to valve flap 30. Pad 58 includes a body portion 60 that is attached to first planar portion 32 and an end portion 62 that extends over first arcuate edge 42 of first planar portion 32. Although pad 58 may be made from a variety of different materials and may be attached to the valve flap 30 in a number of different ways, in the illustrated example, pad 58 is constructed from a wire mesh material. Portions of the wire mesh material are deformed to define compressed dent regions 66 that have an increased density. The compressed dent regions 66 are spot welded to valve flap 30. By way of example without limitation, the wire mesh forming pad 58 may be made from SS316 stainless steel mesh that has a pre-compressed density ranging from 25-30%.

Figure 3:
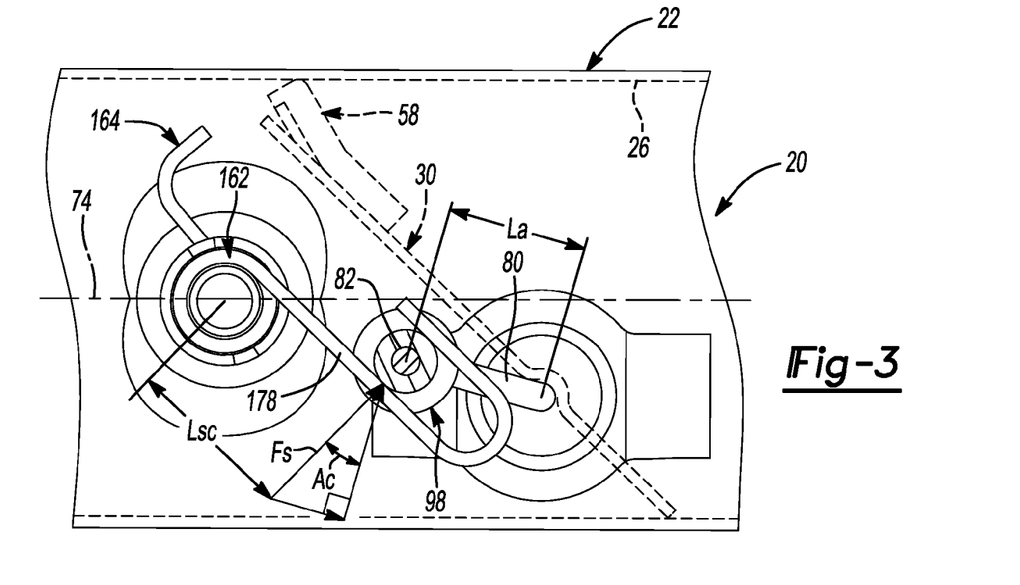
FIG. 3 is a side view of the snap-action valve assembly showing the valve flap in the closed position.
Figure 4:
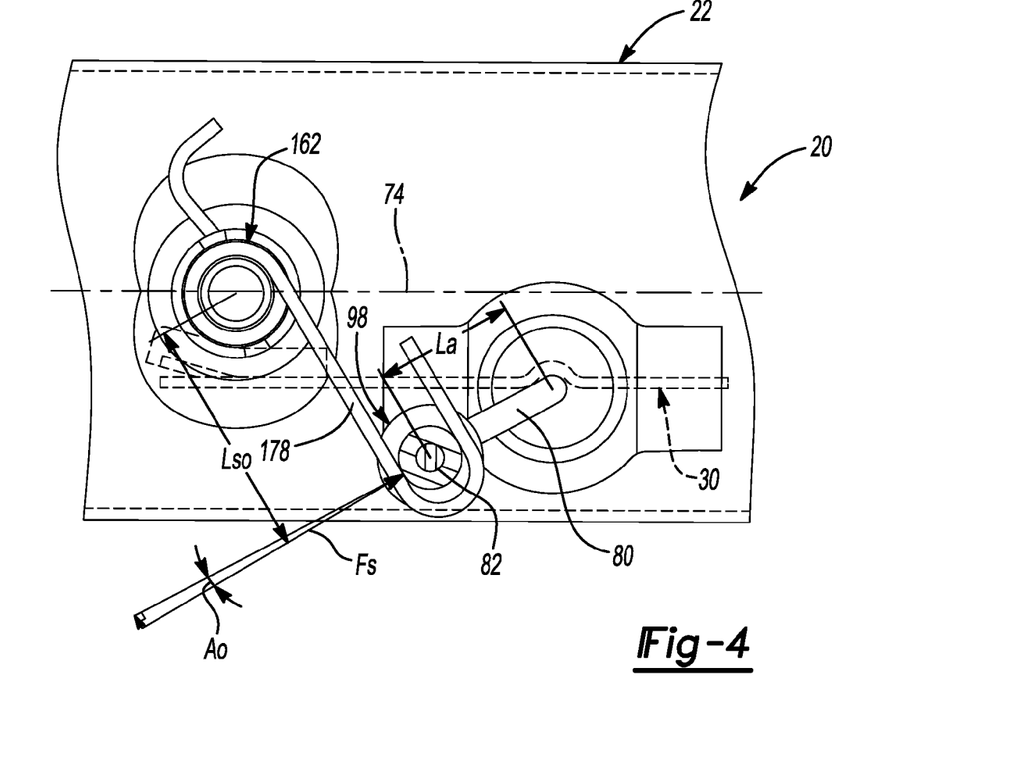
FIG. 4 is a side view of the snap-action valve assembly showing the valve flap in the open position.

A shaft 72 supports valve flap 30 within conduit 22 for rotation between a closed position depicted in FIG. 3 and an open position depicted in FIG. 4. When valve flap 30 is in the closed position as shown in FIG. 3, end portion 62 of pad 58 contacts inner surface 26 of conduit 22. When valve flap 30 is in the open position as shown in FIG. 4, valve flap 30 is positioned such that the valve flap extends substantially parallel to a longitudinal axis 74 of conduit 22. When valve flap 30 is in the closed position, a majority of the exhaust flow through conduit 22 is obstructed. Some flow occurs between valve flap 30 and inner surface 26 when valve flap 30 is in the closed position. When valve flap 30 is in the open position, flow through conduit 22 is relatively unobstructed. It should be appreciated that the open position may be associated with other valve flap orientations where valve flap 30 is not parallel to longitudinal axis 74.

Shaft 72 includes an axle portion 78, a lever arm 80 and a post 82. At least some of axle portion 78 is disposed within conduit 22 while some of axle portion 78, lever arm 80 and post 82 are disposed externally to conduit 22. Axle portion 78 extends linearly through apertures 84 extending through conduit wall 24. Apertures 84 may simply extend through a cylindrically-shaped portion of wall 24 or may alternately be associated with inwardly extending bosses 85. Bosses 85 may be integrally form from conduit 22 or may comprise separate components fixed to conduit 22. Axle portion 78 defines a pivot axis 86 about which valve flap 30 rotates. Pivot axis 86 extends transverse to longitudinal axis 74 and is spaced apart from longitudinal axis 74. Stated another way axle portion 78 is positioned off-center within conduit 22. Valve flap 30 is carried on axle portion 78 and at least some of axle portion 78 is received within channel 38 of curved portion 36 of valve flap 30. Curved portion 36 is fixed to axle portion 78 of shaft 72 such that axle portion 78 rotates with valve flap 30. By way of example and without limitation, curved portion 36 is fixedly secured to axle portion 78 by welding.

Post 82 extends from lever arm 80 at a right angle along a roller axis of rotation 92. Roller axis of rotation 92 extends parallel to and spaced apart from pivot axis 86. In the exemplary configuration depicted in the Figures, a plane extending through roller axis 92 and pivot axis 86 need not extend parallel to the plane at which valve flap 30 rests when in the closed position. It should be appreciated that shaft 72 may be constructed from a variety of different materials. By way of non-limiting example, shaft 72 may be made from SS430 stainless steel and may have an outer diameter of 6 mm.

A roller 98 includes an outer cylindrical surface 100, a through bore 102 and a circumferential groove 104. Post 82 is positioned within through bore 102 to support roller 98 for rotation thereon.

Snap-action valve assembly 20 includes first and second bushings, 110, 112 that support axle portion 78 for rotation relative to conduit 22. Each of the first and second bushings 110, 112 includes a through aperture 116 in receipt of axle portion 78. Each bushing includes a cylindrically shaped body 118 and a radially outwardly extending flange 120. Each body 118 is sized to fit within one of apertures 84 from the outside of conduit 22. Flange 120 engages outer surface 28 of conduit 22 to restrict movement of bushings 110, 112 toward longitudinal axis 74.

Bushing caps 128 capture wave washers 130 between an inner surface 134 of bushing cap 128 and flange 120. Wave washers 130 exert a load to engage flange 120 into contact with outer surface 28 of conduit 22. Each bushing cap 128 includes an aperture 136 for receipt of axle portion 78. When snap-action valve assembly 20 is fully assembled, curved portion 36 of valve flap 30 is positioned between first and second bushings 110, 112. First and second bushings 110, 112 may be constructed from a variety of different materials. In the illustrated example, first and second bushings 110, 112 are made of wire mesh. In the embodiment depicted in the Figures, the wire mesh of first and second bushings 110, 112 may be SS316 stainless steel mesh with a density of approximately 40%. The wire mesh may optionally be impregnated with mica or graphite.

Conduit 22 includes a support 142 fixed thereto. Support 142 includes a cylindrically shaped body 144 and a radially outwardly extending flange 146. Flange 146 is fixed to outer surface 28 of conduit 22 via a process such as welding. Body 144 includes a cylindrically-shaped surface 148 that terminates at a free distal end having a curved surface 150. Cylindrical surface 148 defines a spring alignment surface and a coil axis 154. Coil axis 154 extends parallel to pivot axis 86. While support 142 is depicted as a separately formed component subsequently welded to conduit 22, it is contemplated that an outwardly extending protrusion similarly shaped to support 142 may be integrally formed with wall 24 of conduit 22 without departing from the scope of the present disclosure. Processes such as metal stamping or hydroforming may be used to form such an integrally formed support. In each instance, an external surface of support 142 remains separated from and not in fluid communication with an internal volume of conduit 22.

A torsion spring 162 includes a first end 164 and a second end 166. First end 164 is adapted to be fixed to conduit 22 via a retainer 168. Second end 166 is positioned within circumferential groove 104 for applying a load to roller 98. Although torsion spring 162 may take a variety of different forms, in the illustrated example, torsion spring 162 includes a helical coil 174 disposed between a first torque arm 176 and a second torque arm 178. A first hook end 182 extends from first torque arm 176 and a second hook end 184 extends from second torque arm 178. Second hook end 184 includes an extended linear portion 188 to assure that spring 162 remains engaged with roller 98 and positioned within circumferential groove 104 through the entire articulation range of valve flap 30 between the open and closed positions.

Torsion spring 162 biases valve flap 30 toward the closed position depicted in FIG. 3. As will be explained in greater detail, valve flap 30 opens against a biasing force provided by torsion spring 162 when the pressure of the exhaust flowing through conduit 22 exerts a net torque on valve flap 30 exceeding the torque provided by torsion spring 162 acting on roller 98 through lever arm 80 of shaft 72. When the pressure of the exhaust flowing through conduit 22 acting on the valve flap 30 exerts a net torque about pivot axis 86 less than the net torque provided by torsion spring 162 and lever arm 80, valve flap 30 moves toward the closed position. Torsion spring 162 may be made from a variety of different materials. By way of non-limiting example, torsion spring 162 may be made from Inconel 718 or Alloy 41 metals with suitable heat treatment.

Retainer 168 is shaped as a hollow cylindrical member including an inner surface 192, an outer surface 194, a window 196, and a pair of diametrically opposed notches 198, 200. In the embodiment depicted in the Figures, the cylinder of retainer 168 is split such that a first wall 204 is spaced apart from a second wall 206. Inner surface 192 is sized and shaped to closely meet an outer diameter of helical coil 174. Window 196 includes first and second faces 212, 214 that are spaced apart from one another a distance sufficient to receive first torque arm 176 of torsion spring 162. Notches 198, 200 inwardly extend from an opposite end of retainer 168 as window 196. Notches 198, 200 are sized and positioned to receive a tool (not shown) for applying a torque to retainer 168. A target preload of valve flap 30 on inner surface 26 may be empirically determined or calculated based on a target exhaust gas pressure at which the valve should begin to open.

One of the primary functions of snap-action valve assembly 20 is to reduce low frequency noise at low exhaust flow rates. Another desired function is to have snap-action valve assembly 20 create only a minimum pressure drop at high flow rates. Valve size, weight and costs are also preferably minimized. Snap-action valve assembly 20 achieves these goals by positioning the valve components in a particular geometric relationship with one another as shown in FIGS. 3 and 4. Pivot axis 86 is offset relative to longitudinal axis 74. A length $L_a$ of lever arm 80 as well as a length $L_s$ of second torque arm 178 are determined to work in concert with the mechanical characteristics of torsion spring 162. A force $F_s$ is applied to the roller via torsion spring 162. The angle at which $F_s$ is applied relative to lever arm 80 must be taken into account to calculate the torque about axle portion 78. As such, an angle A is identified in both FIGS. 3 and 4. It should be noted that the lever arm length $L_a$ remains constant while the spring arm length $L_s$ and the application angle A change as the valve flap position changes. Accordingly, FIG. 3 includes identifiers $L_{sc}$ and $A_c$ corresponding to the valve closed position while FIG. 4 includes lever arm length $L_{so}$ and angle $A_o$ corresponding to the geometry associated with the valve being in the open position. Each geometric relationship described provides a torque about axle portion 78 versus valve angle curve that decreases as the valve moves from the closed position to the open position. Therefore, the pressure drop across valve flap 30 decreases as exhaust flow rate increases.

Figure 5:
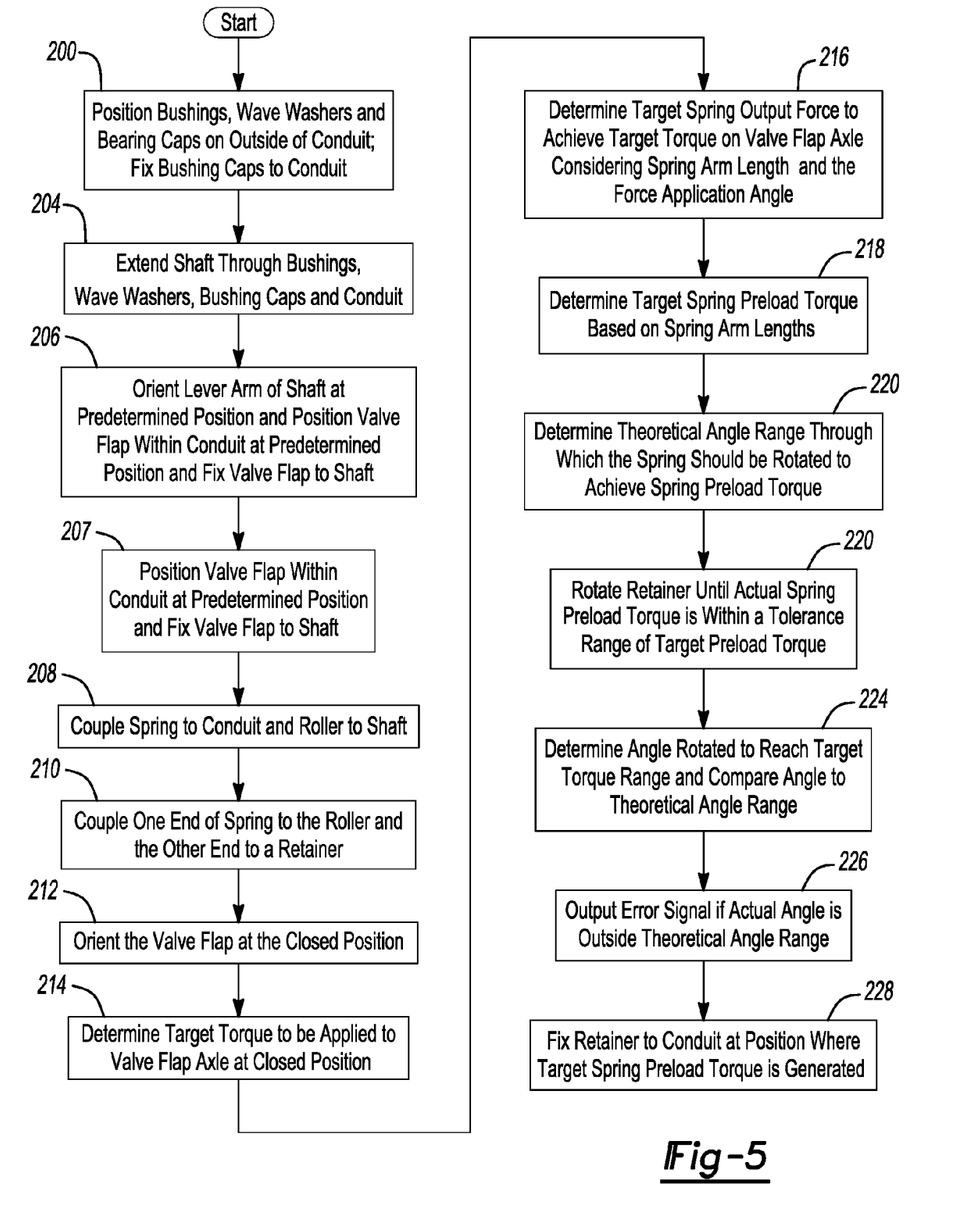
FIG. 5 is a flow chart describing a method of assembling a snap-action valve assembly.

FIG. 5 depicts a method of assembling snap-action valve assembly 20. At block 200, bushings 110, 112, wave washers 130 and bushing caps 128 are positioned outside of conduit 22 and aligned with apertures 136 extending through wall 24. Bushing caps 128 are fixed to outer surface 28 of conduit 22. Axle portion 78 is positioned to extend through bushings 110, 112, wave washers 130 and bushing caps 128 at block 204. At block 206, lever arm 80 is oriented at a predetermined position relative to the position of valve flap 30 and the two components are fixed to one another. At blocks 208 and 210, spring 162 is positioned on support 142 and roller 98 is rotatably positioned on post 82. One end of spring 162 is coupled to roller 98.

Retainer 168 is oriented to at least partially surround helical coil 174. During assembly, retainer 168 may be axially translated such that first torque arm 176 is received within window 196 of retainer 168. The other end of spring 162 is coupled to retainer 168. At block 212, valve flap 30 is oriented to the closed position.

After the various components have been properly positioned on shaft 72 and relative to wall 24 of conduit 22 as depicted in FIG. 3, valve flap 30 is fixed to axle portion 78 at block 207 after a desired orientation of lever arm 80 to valve flap 30 is set. Also, bushing caps 128 are welded to wall 24 of conduit 22. For example, a fixture may be provided to orient lever arm 80 at a desired position once valve flap 30 is located at the closed position.

At block 214, a target torque to be applied to axle portion 78 is determined. The target torque is applicable to valve flap 30 being at the closed position. As previously mentioned, this target torque may be empirically determined or theoretically calculated based on the geometry of the valve flap and the conduit. Block 216 describes determining a target spring output force to achieve the target torque on axle portion 78. As previously discussed, such calculation would consider the spring arm length of second torque arm 178 and the angle at which the force is applied from the spring.

A target spring preload torque is determined at block 218. The target spring preload torque is based on the length of second torque arm 178, a length of first torque arm 176, and the target torque to be applied to axle portion 78. Based on the geometrical features of the spring as well as the material properties of the spring, a theoretical deflection angle range through which the spring should be rotated to achieve the target spring preload torque may be calculated.

Once the target spring preload torque and deflection angle have been determined, an external preload tool (not shown) is engaged with notches 198, 200 to impart preload to torsion spring 162 at block 220. It is envisioned that a manual or automated process may be used to apply the target spring preload torque to a predetermined range to bias valve flap 30 into engagement with inner surface 26 thereby setting the exhaust pressure required to initially move valve flap 30 from the closed position. Once the desired torque is applied to retainer 168, retainer 168 is welded to conduit 22 to maintain the spring preload as shown at block 228. A low heat generation attachment process is envisioned such as laser welding.

Optional quality controls may be implemented at block 224 that include monitoring the angle through which retainer 168 is rotated during the preloading process. Once the desired torque has been met, the angle is measured and compared to a predetermined range of acceptable deflection. In this manner, a quality check will be made relative to output characteristics of the spring. The user and/or machine may determine whether the installed spring exhibits the expected torsional stiffness. If the angle is outside of the predetermined range, an error signal may be output at block 226 indicating a need to inspect or otherwise evaluate the snap-action valve assembly 20 or the preload and retainer attachment system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A snap-action valve assembly for an exhaust system, comprising:
   a conduit extending along a longitudinal axis and including a wall having an inner surface;
   a valve flap positioned within the conduit for controlling exhaust flow through the conduit;
   a shaft supporting the valve flap in the conduit for rotation about a pivot axis between a closed position and an open position;
   a roller supported for rotation on a post, wherein the post is fixed to the shaft by a lever arm;
   a torsion spring having a first end coupled to the conduit and a second end coupled to the roller, wherein the torsion spring is preloaded to urge the valve flap into contact with the inner surface of the conduit when the valve flap is in the closed position; and
   a retainer fixed to the conduit, the retainer restricting the first end of the torsion spring from movement once the preload has been set, wherein the retainer directly engages the torsion spring and restricts at least a portion of the torsion spring from moving relative to the conduit, wherein the retainer is rotatable to preload the torsion spring prior to the retainer being fixed to the conduit.

2. The snap-action valve assembly of claim 1, wherein the post extends along an axis parallel to the pivot axis and wherein the pivot axis extends transversely to the longitudinal axis of the conduit.

3. The snap-action valve assembly of claim 1, wherein the torsion spring applies a load to the roller and the load is transferred through the lever arm to the shaft to apply a torque to the valve flap in a direction opposite to which exhaust flowing through the conduit acts upon the valve flap to apply a torque to the shaft.

4. The snap-action valve assembly of claim 3, wherein the torque provided by the torsion spring, the roller and the lever arm has a lesser magnitude when the valve flap is in the open position as compared to when the valve flap is in the closed position.

5. A snap-action valve assembly for an exhaust system, comprising:
   a conduit extending along a longitudinal axis and including a wall having an inner surface;
   a valve flap positioned within the conduit for controlling exhaust flow through the conduit;
   a shaft supporting the valve flap in the conduit for rotation about a pivot axis between a closed position and an open position;
   a roller supported for rotation on a post, wherein the post is fixed to the shaft by a lever arm; and
   a torsion spring having a first end coupled to the conduit and a second end coupled to the roller, wherein the torsion spring is preloaded to urge the valve flap into contact with the inner surface of the conduit when the valve flap is in the closed position, wherein the roller includes a groove in receipt of a portion of the torsion spring.

6. A method of assembling a snap-action valve assembly, the method comprising:
   fixing a valve flap to a shaft and supporting the valve flap in a conduit for rotation about a pivot axis between a closed position and an open position;
   supporting a roller for rotation on a post, wherein the post is fixed to the shaft by a lever arm;
   coupling a first end of a torsion spring to a retainer and a second end of the torsion spring to the roller;
   rotating the retainer and the torsion spring to a target spring preload torque prior to fixing the retainer such that the valve flap is urged into contact with an inner surface of the conduit when the valve flap is in the closed position; and
   fixing the retainer to the conduit to maintain the target spring preload torque.

7. The method of assembling a snap-action valve assembly of claim 6, further including determining a target torque to be applied to the valve flap about the pivot axis, when the valve flap is at the closed position.

8. The method of assembling a snap-action valve assembly of claim 7, further including determining a target spring output force to achieve the target torque about the pivot axis based on spring arm lengths and an angle at which the force is applied to the roller from the spring.

9. The method of assembling a snap-action valve assembly of claim 8, further including determining a target spring preload torque based on spring arm lengths.

10. The method of assembling a snap-action valve assembly of claim 9, further including determining an theoretical angle range through which the spring should be rotated to achieve the target spring preload torque.

11. The method of assembling a snap-action valve assembly of claim 10, further including determining the angle through which the retainer is rotated to achieve the target spring preload torque and comparing the actual angle of spring rotation to the theoretical angle range and outputting an error signal if the actual angle is outside of the theoretical angle range.

* * * * *